United States Patent
Lehman et al.

(10) Patent No.: US 7,383,695 B2
(45) Date of Patent: Jun. 10, 2008

(54) METHOD OF ANALYZING MIXED-COLOR CULLET TO FACILITATE ITS USE IN GLASS MANUFACTURE

(75) Inventors: Richard L. Lehman, Princeton, NJ (US); Warren Blasland, Jr., Wellington, FL (US)

(73) Assignee: Culchrome LLC, Charlotte, NC (US)

( * ) Notice: Subject to any disclaimer, the term of this patent is extended or adjusted under 35 U.S.C. 154(b) by 416 days.

(21) Appl. No.: 10/988,018

(22) Filed: Nov. 12, 2004

(65) Prior Publication Data

US 2006/0101856 A1    May 18, 2006

(51) Int. Cl.
*C03C 6/02* (2006.01)
*C03C 4/02* (2006.01)
*C03B 5/24* (2006.01)

(52) U.S. Cl. ............. 65/29.16; 65/29.11; 65/29.12; 65/29.18; 65/160; 209/930; 700/157

(58) Field of Classification Search ........... 65/28, 65/29.12, 29.16, 158, 160, 134.3, 134.8, 65/29.11, 29.18, 135.9; 209/522, 580, 930, 209/659, 523; 700/157
See application file for complete search history.

(56) References Cited

U.S. PATENT DOCUMENTS

| 4,187,775 | A |   | 2/1980  | Flender ................. 100/39 |
| 4,252,551 | A |   | 2/1981  | Mishimura ............. 65/28 |
| 4,347,073 | A |   | 8/1982  | Aubourg et al. ......... 65/28 |
| 5,399,181 | A |   | 3/1995  | Sorg ...................... 65/27 |
| 5,663,997 | A | * | 9/1997  | Willis et al. ............ 378/45 |
| 5,718,737 | A |   | 2/1998  | Mosch .................. 65/30.1 |
| 5,741,342 | A |   | 4/1998  | Alexander ............. 65/136.1 |
| 6,144,004 | A | * | 11/2000 | Doak ..................... 209/581 |
| 6,230,521 | B1| * | 5/2001  | Lehman ................. 65/29.11 |
| 6,748,883 | B2|   | 6/2004  | Solis-Martinez ......... 110/347 |

FOREIGN PATENT DOCUMENTS

EP           0 709 138 A2    5/1996

* cited by examiner

*Primary Examiner*—Eric Hug
(74) *Attorney, Agent, or Firm*—Woodcock Washburn LLP

(57) ABSTRACT

A method of determining the constituents and impurities in mixed-color cullet to facilitate use of mixed-color cullet in glass manufacture is provided. A glass batch formulation is adjusted based on the measured characteristics of supplied mixed-color cullet. More specifically, certain preferred aspects of the present invention include the steps of providing quantity of mixed-color cullet, collecting at least one sample of the mixed-color cullet, performing, either singularly or in combination, particle size analysis, particle color analysis, or organics analysis of the mixed-color cullet, optionally storing the analysis results, determining a glass batch formulation, providing the cullet specification and the batch formulation to a glass manufacturer, and adjusting glass batch formulation based on the cullet specification to ensure consistent glass quality.

47 Claims, 2 Drawing Sheets

METHOD OF ANALYZING MIXED-COLOR CULLET TO FACILITATE ITS USE IN GLASS MANUFACTURE

FIELD OF THE INVENTION

The present invention relates to the field of glass production. More particularly, the present invention relates to a method of determining the constituents and impurities in mixed-color cullet to facilitate its use in glass manufacture.

BACKGROUND OF THE INVENTION

Cost-effective recycling of materials, such as glass, has become an increasingly important issue because of stresses on the environment and scarcity of resources. Concern about these issues has prompted governmental involvement, including the establishment of governmental guidelines, e.g., "bottle bills." Because of governmental requirements and environmental awareness, American consumers are now recycling at a greater rate than ever before.

Increased recycling of materials reduces the amount of materials, such as glass, plastics, paper, etc., that enters landfills or other waste disposal points. Additionally, recycling significantly reduces the need for manufacturers to use "virgin" materials, and thus preserves environmental resources. Further, the use of recyclables in place of virgin raw materials often reduces energy requirements, eliminates process steps, and reduces waste streams, including air emissions during product manufacturing. For example, recycled glass requires less energy and emits fewer contaminants during the glass manufacturing process than virgin raw materials do. Many states have placed demands on glass manufacturers that require that new glass bottles to contain a minimum percentage of recycled glass. For example, in Oregon, glass container manufacturers are required to use at least 35% post-consumer cullet, which is broken pieces of glass. California has even more aggressive laws, which require glass manufacturers to increase use of recycled content to 65% by 2005.

However, there are associated issues of complying with these governmental mandates. Prohibitive sorting costs have made it difficult for suppliers to process an adequate quantity of single-colored recycled glass. Often, the glass coming into a material recovery facility (MRF) and/or a glass processing facility, e.g., a site where cullet is cleaned and prepared for shipment to glass manufacturers, is broken, contaminated with other materials, and of mixed color. Such material was previously unusable for glass manufacturing and was used in low value applications or simply placed in a landfill. Currently, however, regulatory requirements and other issues are forcing glass manufacturers to increase the amount of mixed-color cullet used in their furnaces.

Generally, fewer problems exist when recycling clean sources of glass cullet which are of the same composition as products being manufactured. However, since most cullet is derived from consumer waste, the main issue is how well-segregated the different glass waste streams are, and the consequent level of contamination. Foreign material such as ceramics (such as pottery and china, from restaurants and/or bars); stones, gravel and/or dirt (from poor storage of cullet); ferrous metals (from bottle tops and other scrap); non-ferrous metals (lead foils from wine bottles or aluminum bottle caps); and organics (labels and excessive food residue) can all render a batch of cullet unusable. Glass manufacturers face several significant issues, a primary one concerns utilizing mixed-color cullet in glass production in order to comply with the new environmental laws.

Glass manufacturers are especially concerned about the quality of glass supplied from post-consumer streams. With glass batch formulations now able to contain mixed cullet (i.e., glass of mixed colors, typically green, amber, and flint), mixed cullet or single-colored glass received by glass manufacturers should consistently meet the specifications given by the suppliers. Glass manufacturers rely upon these specifications, which specify glass compositions and levels of impurities, to develop a glass batch recipe or formulation for manufacturing bottles.

Generally, the glass making operation is a continuous batch process where the cullet is melted and subsequently dissolved with other raw materials necessary to achieve the required final glass composition. The addition of colored cullet affects, amongst other processing variables, the rate of heat transfer and hence the rate at which the glass melts. Thus, each batch may require a different formulation of raw materials to achieve the desired final glass composition and consistent end product quality. Unfortunately, the supplied specifications may not be accurate, and glass manufacturers often have to "guesstimate" batch formulations. For example, "pure" amber cullet from a processor may contain five or ten percent of other colors and impurity specifications for ceramic and organic contamination may be vague approximations. Any discrepancy between the specifications listed and the actual composition of the supplied glass results in glass that is not uniform in color compared to other glasses manufactured from different batches. This practice has been tolerated by the glass industry as long as cullet use levels were low. As cullet usage increases, what is needed is a way to analyze and characterize mixed cullet to ensure that specifications required for glass manufacture are met.

Mixed-color cullet has often been processed and cleaned by entities, such as MRFs and/or processors, before it is shipped to a glass manufacturer. However, the supply of mixed-color cullet still often contains residual contaminants, such as ceramics and other impurities, which have escaped the sorting and cleaning devices. Such impurities within the mixed-color cullet are a serious concern to glass manufacturers and contribute to the inconsistent color and quantity of manufactured glass, if adjustments to the batch formulation are not made. What is needed is a way to determine the component constitution of mixed cullet utilized in glass manufacture, thereby allowing the glass batch formulation to be adjusted accordingly.

One method of using waste glass for glass manufacturing is described in U.S. Pat. No. 4,252,551, entitled, "Method of continuously preparing molten glass utilizing waste glass as part of ingredients." The '551 patent describes a method of preparing molten glass in a melting tank of the continuous type by utilizing, as part of the ingredients, waste glass, which may be either pulverized cullet of chopped glass fiber, and which may include an organic substance detrimental to the color, or other properties of the molten glass. The waste glass and other raw materials are fed to molten glass in the tank continuously but separately, such that the waste glass is remelted without contacting the unmelted raw materials and that remelting of the waste glass is preceded by burning any organic substance possibly adhered to the waste glass fed to the tank, and the resultant combustion gas is dissipated.

While the '551 patent provides a suitable method of using waste glass that has impurities for glass manufacturing, it does not provide a way to analyze and characterize mixed-color cullet to ensure that specifications required for glass manufacture are met. Nor does the '551 patent provide a way to determine the component constitution of the waste glass prior to its being utilized in the glass manufacturing process.

One method of using mixed colored cullet for glass manufacturing is described in U.S. Pat. No. 5,718,737, entitled, "Method of recycling mixed colored cullet into amber, green, or flint glass." The '737 patent, herein incorporated by reference, describes how mixed colored cullet glass is recycled into amber colored glass by regulating the additive amounts of amounts of iron, carbon, sulfur, and sulfur compounds in the mixture to impart the desired reddish-brown hue. While the '737 patent provides a suitable method of using mixed colored cullet for glass manufacturing, it does not provide a way to eliminate variability within the batch formulations. One automated real-time method of determining cullet composition is described in U.S. patent application Ser. No. 10/988,019, entitled "System For And Method of Batch Analysis And Optimization For Glass Manufacturing."

U.S. Pat. No. 6,230,521, entitled, "Method of recycling batches of mixed color cullet into amber, green, or flint glass with selected properties," herein incorporated by reference, describes an automated method for recycling mixed colored cullet glass into new glass products. A computer-controlled process identifies the virgin glass raw materials, the desired target glass properties, the composition of a batch of mixed colored cullet, and the quantity of cullet to be used in the glass melt. The computer controlled process automatically determines the proper amounts of raw materials to add to the batch of mixed colored cullet so that recycled glass is produced that has the desired coloring oxides, redox agents, and glass structural oxides in the proper proportion. However, neither the '737 nor '521 patent provide analysis of the composition of mixed-color cullet as it is introduced into the glass manufacturing process in order to ensure end-product uniformity.

Therefore, there exists a need in the art for a method for analyzing and characterizing mixed-color cullet to ensure that specifications required for glass manufacture are met. Further, there exists a need to determine the component constitution of mixed-color cullet utilized in glass manufacture, thereby allowing the glass batch formulation to be adjusted accordingly.

SUMMARY OF THE INVENTION

Presently preferred embodiments of the present invention provide a method of determining the constituents and impurities in mixed-color cullet to facilitate its use in glass manufacture. Further, certain embodiments of the present invention provide a method of adjusting a glass batch formulation based on the characteristics of supplied mixed-color cullet. More specifically, presently preferred embodiments of the method includes the steps of collecting at least one sample of mixed-color cullet from a quantity of mixed color cullet, performing, either singularly or in combination, particle size analysis, particle color analysis, and/or organics analysis of the mixed-color cullet, optionally storing the analysis results, determining a glass batch formulation, providing the cullet specification and a batch formulation to a glass manufacturer, and adjusting glass batch formulation to ensure consistent glass quality.

Thus, certain embodiments of the present invention provide a method to identify various composition/constituents of a quantity of mixed-color cullet. Further, certain embodiments of the present invention provide a method of using information generated from cullet analysis to generate a glass formulation ensuring that the recycled glass is produced having the desired final composition. The recycled glass is then used to make glass products such as beer bottles.

DETAILED DESCRIPTION OF ILLUSTRATIVE EMBODIMENTS

The method of recycling mixed cullet with the above-mentioned beneficial features in accordance with the presently preferred embodiment of the invention will be described below with reference to FIGS. 1-2. It will be appreciated by one skilled in the art that the description given herein with respect to those figures is for exemplary purposes only and is not intended in any way to limit the scope of the invention.

The presently preferred embodiment of the invention is a method of determining the constituents and impurities in mixed-color cullet to facilitate its use in glass manufacture. More specifically, the method of the present invention determines the constituents and impurities in mixed-color cullet, such as, but not limited to, three-color mixed cullet, as described in U.S. patent application Ser. No. 11/270,654 entitled, "System for and method of mixed-color cullet characterization and certification and providing contaminant-free, uniformly colored mixed color cullet," herein incorporated by reference.

A typical glass recycling flow can be summarized as follows. The waste glass originates with, for example, consumers who discard recyclables that include empty glass containers. Recyclable collection points may include, for example, residential curbsides, community drop-off points, and/or reverse vending sites. Collectors then collect the recyclables from these various collection points and often are required to do some sorting, such as separating the recyclables into glass, paper, plastics, and metals. The collectors transport the collected solid waste to an MRF, where a gross sort is performed to further sort recyclable from non-recyclable material and a finer sort of recyclables by type, e.g., glass, plastics, paper, etc., is performed. Additionally, at the MRF, the sorted glass is further hand-sorted for separation by color (e.g., into amber, green, and flint) as well as sorted for contaminants, such as ceramics. Once the glass has been sorted for color, the color-sorted cullet and, optionally, any mixed-color cullet, is transported from the MRF to a next glass processing facility, e.g., the processor, for further processing, such as cleaning and purifying, prior to its delivery to a glass manufacturing plant.

Figure 1:
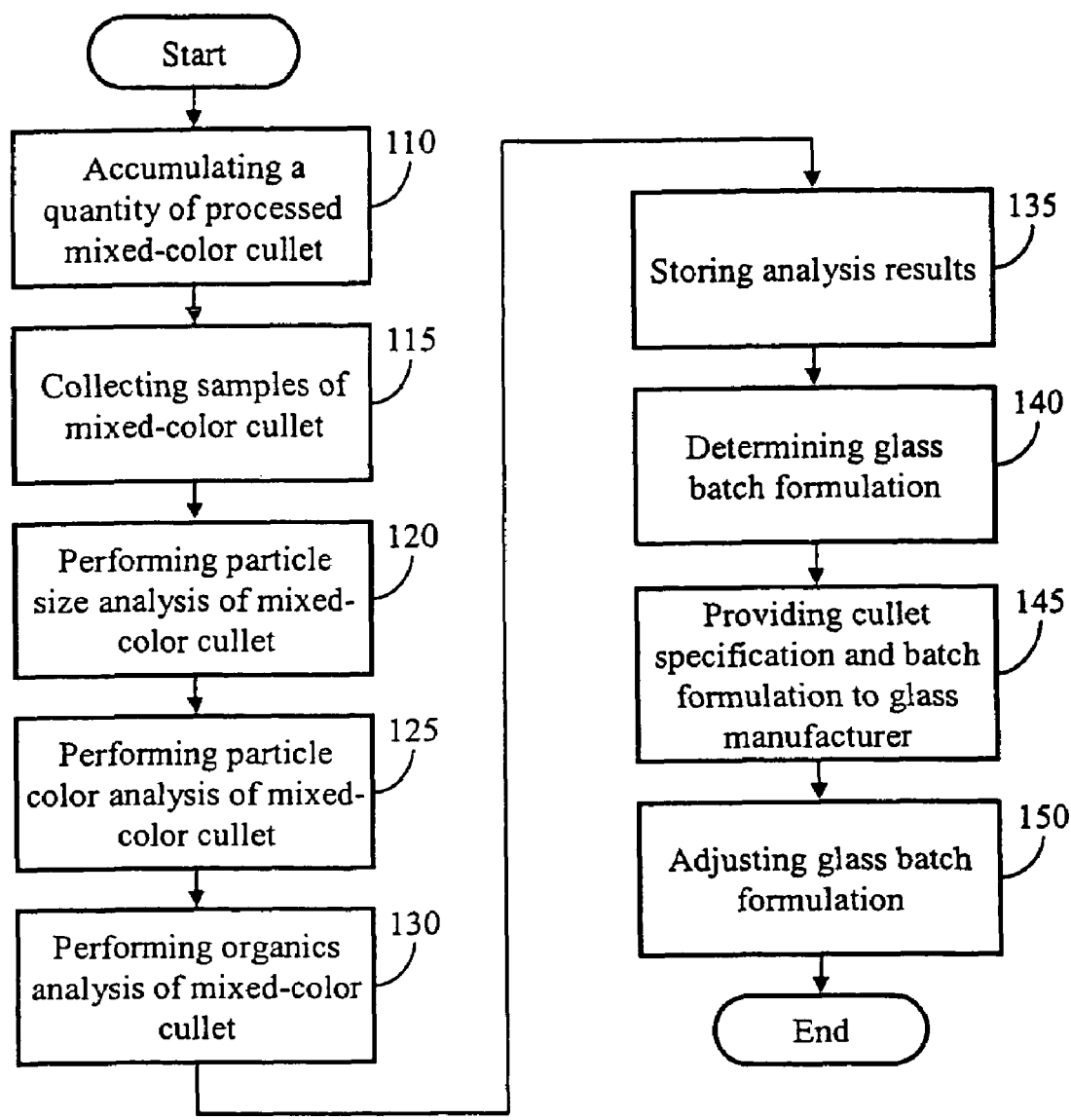
FIG. 1 illustrates a flow diagram of a method of determining the constituents and impurities in mixed-color cullet to facilitate its use in glass manufacture, in accordance with the invention.
Figure 2:
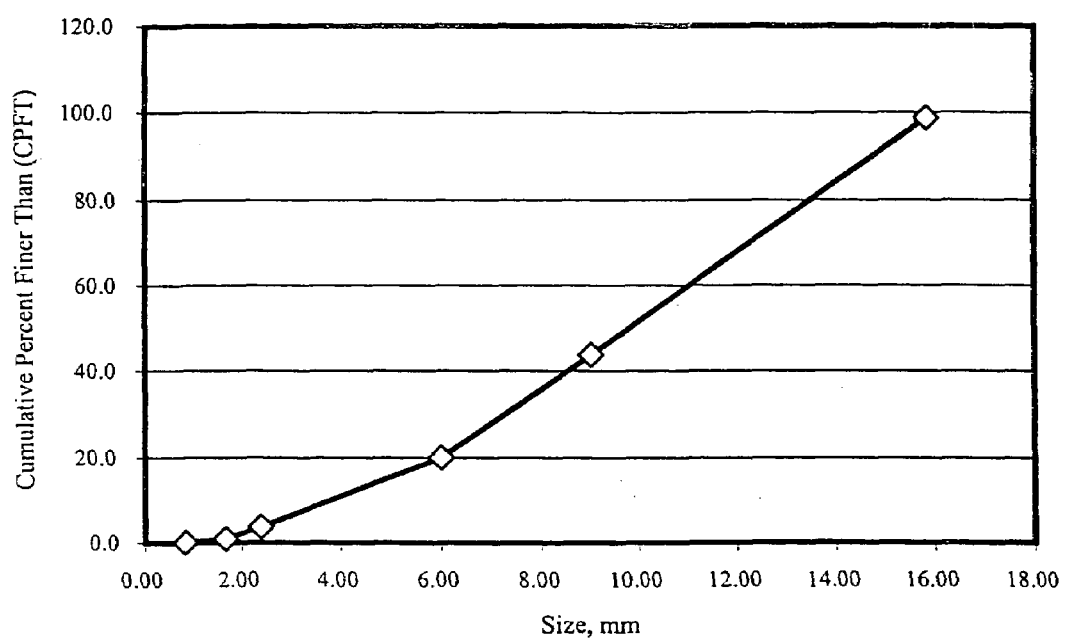
FIG. 2 illustrates a plot of three-color mixed cullet particle size in millimeters vs. expected cumulative percent finer than (CPFT).

FIG. 1 illustrates a flow diagram of a method 100 of determining the constituents and impurities in mixed-color cullet to facilitate its use in glass manufacture in accordance with the invention. The steps of method 100 may be automated, performed manually or some combination thereof. Further, the steps of the method 100 of the present invention are preferably performed at the processor site to verify that the mixed-color cullet being supplied to the glass manufacturer meets predetermined minimum standards, and to determine what allowable contaminants and impurities, such as organics, remain in the mixed-color cullet and at what levels, thereby allowing the glass batch formulation to be adjusted accordingly at the glass manufacturer.

Although three-color mixed cullet is referenced throughout the steps of the method, it is understood that the method is not limited only to analyzing three-color mixed cullet. The present invention may generally apply to any mixed-color cullet, such as two-, four-, or five-color mixed cullet. Furthermore, use of the present invention is suitable to determine the constituents and impurities within, for example, two-, three-, four-, or five-color mixed-color cullet, within which there is no one predominant color of 90% or more.

As illustrated in FIG. 1, presently preferred embodiments of the present invention includes the steps of:

Step 110—Accumulating a discrete quantity of processed mixed-color cullet. In this step, a discrete quantity of mixed-color cullet is accumulated in bulk at a glass processing facility, i.e., at the beneficiator. In one example, three-color mixed cullet is processed as described in U.S. patent application Ser. No. 11/270,654 entitled, "System for and method of mixed-color cullet characterization and certification and providing contaminant-free, uniformly colored mixed color cullet," thereby providing a stockpile of mixed-color cullet suitable for use in a glass manufacturing process. For the purposes of method 100 of the present invention, due to use of the process described in this related application, it is assumed that the level of ceramics contained within the mixed cullet is very low, i.e., less than or equal to an acceptable level for glass manufacturing.

Step 115—Collecting samples of mixed-color cullet. In this step, multiple randomly selected samples of the bulk mixed-color cullet are collected. A typical sample size is, for example, about 1-5 kg in weight, however one skilled in the would understand that any amount of sample may be suitable for certain aspects of the present invention. Because particles within the bulk mixed-color cullet tend to segregate by weight and size, it is important to maintain rigorous sampling protocols, such that each sample obtained provides a true representation of the mixed-color cullet composition. Methods of collecting an analytical sample include:

1. Randomly collecting 1-5 kg samples of mixed-color cullet as each truck is being filled with the bulk mixed-color cullet at the glass processing facility. For example, mixed-color cullet is transferred off a conveyor belt and into a truck at, for example, a rate of 10-40 tons per hour. In this case, the collection operation includes the steps of:
   i. determining the unit of time required to fill one truck;
   ii. dividing this unit of time into ten equal time intervals;
   iii. collecting 1-5 kg samples at each of the ten time intervals as the truck is being loaded, which results in the collection of ten samples per truckload;
   iv. commingling the ten samples to form a composite volume of mixed-color cullet; and
   v. collecting a 1-5 kg sample from the composite volume to form the analytical sample.
2. Alternative collection method: Randomly collect 1-5 kg samples of mixed-color cullet as each truck is being unloaded at the glass manufacturing plant. For example, mixed-color cullet is transferred off a truck and onto a conveyor belt at, for example, a rate of 10-40 tons per hour. In this case, the collection operation includes the steps of:
   i. determining the unit of time required to unload one truck;
   ii. dividing this unit of time into ten equal time intervals;
   iii. collecting 1-5 kg samples at each of the ten time intervals as the truck is being unloaded, which results in the collection of ten samples per truckload;
   iv. commingling the ten samples to form a composite volume of mixed-color cullet; and
   v. collecting a 1-5 kg sample from the composite volume to form the analytical sample.
3. Other standard collection methods: Those skilled in the art will appreciate that the 1-5 kg samples of mixed-color cullet may be collected at the glass processing facility by using any standard collection technique, such as repeated insertions of a tube, commonly known as a "sample thief," into the bulk mixed-color cullet, to extract a sufficient number of specimens to provide a representative composite sample.

This alternative method is less desirable than the preferred method above because, in the alternative method, the analysis of the mixed-color cullet is done after it has left the glass processing facility, thus the supply of mixed-color cullet is no longer under the control of the supplier. Further, the unit of time required to fill any container, including but not limited to trucks, barrels, etc., may be designated as the fill time. Alternatively, the unit of time required to unload any container, including but not limited to trucks, barrels, etc., may be designated as the unload time. Thus, the sample collection may occur during any fill and/or unload time for any number of containers. Still further, sample collection may be taken randomly or uniformly at any number of intervals of unit time.

Step 120—Performing particle size analysis of mixed-color cullet. In this step, a particle-size analysis is performed on the analytical sample mixed-color cullet to verify the expected quality in regard to particle size. An example expected particle-size range is typically between 1 and 16 mm, as described in more detail in reference to plot 200 of FIG. 2. More specifically, FIG. 2 illustrates plot 200, which shows a mixed-color cullet particle size in millimeters vs. expected cumulative percent finer than (CPFT). One method of performing a particle size analysis is by using a standard sieve analysis on a sample size of, for example 1-2 kg. Sieve analysis is the process of using differently sized screens that have a closely controlled aperture opening to sort the particles that form the mixed-color cullet. More specifically, a determination of particle size distribution is performed by:
   i. drying the 1-2 kg sample to a constant weight;
   ii. screening the 1-2 kg sample into particle-size categories on U.S. standard sieves, selected in accordance with the specifications of the mixed-color cullet. Screening begins with, for example, a 16 mm [⅝"] mesh screen (largest aperture) and progresses in any desired increment to a 40 mesh screen (smallest aperture), thereby sorting the particles from largest to smallest size (e.g., mesh 2.5 is equivalent to about 8 mm, mesh 5 is equivalent to about 4 mm, mesh 10 is equivalent to about 2 mm, mesh 18 is equivalent to about 1 mm, etc);
   iii. weighing the material retained on each screen; and
   iv. calculating each weight as a percentage of the dry weight of the sample.

A further description of sieve analysis is found in reference to the American Society for Testing and Materials (ASTM) specification C136-01, entitled, "Standard Test Method for Sieve Analysis of Fine and Coarse Aggregates."

Step 125—Performing particle color analysis of mixed-color cullet. In this step, a particle color analysis is performed on the analytical sample of mixed-color cullet to determine the percent content of each color. Mixed-color cullet typically includes a mix of flint, amber, and green cullet. The percent content of each color varies regionally. Mixed-color cullet may also include trace amounts of blue particles. Furthermore, the green colored constituents of the mixed-color cullet may include of a mix of both emerald green and deadleaf green particles. Methods of performing particle color analysis include:

1) Preferred color analysis method: Manually separating individual mixed-color cullet particles by color. This manual method is performed by a technician via a visual inspection. In this case, the particle color analysis operation includes the steps of:
   i) selecting a representative portion of the analytical sample, for example, a 500 gm portion;
   ii) spreading out the sample on white paper under sufficient illumination to accurately differentiate colors;
   iii) manually separating the particles by color and size via visual inspection until only small particles remain, e.g., particles less than 2-3 mm in size, the "fines;"
   iv) setting aside the "fines" because it is impractical to separate them further;
   v) weighing the coarse particles of each color:
      (a) weighing the coarse particles of emerald green;
      (b) weighing the coarse particles of deadleaf green;
      (c) weighing the coarse particles of flint;
      (d) weighing the coarse particles of amber; and
      (e) weighing the coarse particles of blue;
   vi) calculating the weight percent of each color:
      (a) calculating the weight percent of emerald green;
      (b) calculating the weight percent of deadleaf green;
      (c) calculating the weight percent of flint;
      (d) calculating the weight percent of amber; and
      (e) calculating the weight percent of blue; and
   vii) making a visual judgment regarding the color mix of the "fines" to determine whether the color mix is representative of the color mix of the coarse particles or, conversely, whether it is predominantly one color. If the "fines" are predominantly one color, this fact is noted in the analysis report. The percent "fines" is preferably 0-10%. If the percent "fines" exceeds, for example, 15%, the particle-size distribution does not meet specifications and may require that the "fines" be analyzed independently by alternative means.

2) First alternative color analysis method: Performing particle color analysis by using a spectrophotometer, which is generally understood to be a device that measures the amount of light absorption of a sample. A spectrophotometer is also more particularly known as a device that can measure intensity as a function of the color, or wavelength, of light. However, one of skill in the art would understand there to be many types of spectrophotometers, any number of which may be applicable to certain aspects of the present invention. Among the common distinctions used to classify them are the wavelengths they work with, the measurement techniques they use, how they acquire a spectrum, and the sources of intensity variation they are designed to measure.

In this case, the particle-color analysis operation includes the steps of:

i) grinding the mixed-color cullet sample to an optimal mesh size, such as between 12 to 40 mesh, for achieving minimal scattering loss and minimal non-homogeneity of the color;
ii) filling a cuvette, which is a well-known transparent receptacle in which sample solutions are introduced into the light path of spectrometers, with the ground mixed-color cullet particles;
iii) filling the cuvette with commercially available refractive index matching oil that matches the refractive index of glass, approximately 1.515;
iv) recording the composite transmission spectrum of mixture; and
v) calculating the volume percent of each color in the sample:
   (a) calculating the volume percent of emerald green;
   (b) calculating the volume percent of deadleaf green;
   (c) calculating the volume percent of flint;
   (d) calculating the volume percent of amber; and
   (e) calculating the volume percent of blue.

This is done by deconvoluting the composite transmission spectrum of the mixture according to generally known methods of curve deconvolution. In short, this is accomplished by first collecting a set of transmission curves for the pure components (e.g., flint, dead-leaf green, emerald green, amber, blue, etc.) followed by algebraically seeking proportionality constants for each (e.g., $K_{emerald\ green}$, $K_{deadleaf\ green}$, $K_{amber}$, $K_{flint}$ and $K_{blue}$) such that the sum of each of these constants multiplied by the transmission curve of its respective glass color, yield the composite transmission curve. Alternatively, the volume percent of each color can be more simply determined with only a small loss of accuracy by using single characteristic intensities for each of the constituent glass colors at a specific wavelength, such as 550 or 650 nm, and by algebraically determining the contributions of each glass color to the total transmission at these wavelengths.

Second alternative color analysis method: Performing particle color analysis by using an X-ray spectrophotometer to chemically analyze the mixed-color cullet. In this case, all colorants, such as chrome, iron, and sulfur, are chemically analyzed to determine the color make-up of the sample. For example, chrome indicates green glass, iron indicates amber glass, cobalt indicates blue glass, etc.

Third alternative color analysis method: Performing particle color analysis by grinding the mixed-color cullet sample to a fine granular consistency and obtaining a color measure of composite by reflection. In this technique, the reflective properties of the glass are used rather than the transmissive properties. The granulated samples, both of the unknown sample and of single color controls are pressed into pellets of a suitable diameter and thickness, e.g., 25 mm diameter and 3 mm thickness, coated with index matching oil, and inserted into a suitable reflective color measuring device, such as that used for determining the reflective color of tiles, textile and paints. When formal equipment is lacking, a suitable substitute maybe be digital camera or a computer scanner. When using these "informal" methods, care must be taken to maintain color accuracy and to diligently calibrate the equipment with a white color standard and/or the equipment controls.

Other alternative color analysis methods: Those skilled in the art will appreciate that the particle color analysis of the mixed-color cullet sample may be performed by any known method that relies on composite color constitution, either done by optical or chemical means.

Step 130—Performing organics analysis of mixed-color cullet. In this step, an organics analysis is performed on the analytical sample of mixed-color cullet to determine the percent content of organic impurities. More specifically, a chemical oxygen analysis is performed by determining the chemical oxygen demand (COD) of the mixed-color cullet sample. COD is a measure of the oxygen-consuming capacity of inorganic and organic matter present in the sample. Chemical oxygen demand (COD) may be generally understood, by one skilled in the art, as a measure of the chemical reducing power of batch constituents and is readily determinable by several analytical techniques. Given that one ton of mixed-color cullet may typically contain 1-5 pounds of organic impurities, step 130 verifies that the amount of organics in one ton of mixed-color cullet does not vary by more than +/−0.25 pounds. Methods of performing organics analysis include:

1) Preferred organics analysis method: Measuring organics by the well-known loss on ignition (LOI) technique. LOI is weight loss, usually expressed as a percent of the original weight after an organic sizing from glass fibers or an organic resin from a glass fiber laminate has been burned off. More specifically, the LOI operation determines the weight loss from the mixed-color cullet sample upon heating it to igniting temperatures, typically exceeding about 500° C. A benefit of the LOI operation is that it occurs at temperatures entirely below the softening point of the glass, yet high enough to remove the organics, for example, temperatures not exceeding about 600° C. The LOI operation yields two parameters: moisture loss and combustible organic loss. In this case, the organics analysis operation includes the steps of:
   i) weighing out a mixed-color cullet sample of approximately 2 kg into a standard crucible, such as a crystallizing dish formed of borosilicate glass;
   ii) placing the mixed-color cullet ample into any standard muffle furnace capable of reaching about 550° C.;
   iii) heating the mixed-color cullet sample in the furnace to between about 100 and about 120° C. until constant weight is achieved, e.g., typically between about 30 and about 120 minutes;
   iv) weighing the mixed-color cullet sample and determining the moisture loss due to drying;
   v) returning the mixed-color cullet sample to the furnace and heating the mixed-color cullet sample to between about 500° C. and about 550° C. again until a constant weight is reached, e.g., typically between about 30 and about 60 minutes; and
   vi) weighing the mixed-color cullet sample and determining the combustible organic loss from ignition.

The resolution of the scale used is determined by the desired resolution of the organics specification per ton of mixed-color cullet. For example, if 0.10 pound per ton resolution is specified, then one pound is equivalent to about one part in 2000 pounds (1 ton), thus 0.10 pound is one part in 20,000 pounds. As a result, a scale that can measure to about 0.10 gram resolution per 2 kg sample is preferred.

2) Alternative organics analysis method: Washing the mixed-color cullet to remove organics by using an elutriation process. Elutriation is generally understood to encompass any number of separation and/or purification methods wherein constituents of a composition are separated with respect to their size, shape, and/or density by means of a directed stream of fluid, being either gas or liquid. One skilled in the art would understand there to be many variations of the technique are applicable to certain aspects of the present invention. Common variations include the direction, speed, and type of gas or liquid used. In a preferred embodiment, the organics analysis operation includes the steps of:
   i) placing about 2 kg of mixed-color cullet sample, either directly or ground finer, into, for example, a one-meter-high glass tube that has an air jet connected to the bottom thereof through a perforated glass disk;
   ii) air-floating the mixed-color cullet sample to remove any low-density materials, such as paper and plastics. This is achieved by allowing air to flow vertically in the column at such a rate that the plastics, paper, and other organic solids are removed from the more dense glass particles;
   iii) capturing the low-density material on a pad of some sort or a screen, leaving only the organics plus, for example, the labels that are still sticking to the mixed-color cullet particles;
   iv) releasing the water soluble glue by washing the mixed-color cullet sample with hot water (typically, at least about 60° C.), thereby removing the labels and retaining the wash water;
   v) collecting and evaporating the wash water to dryness;
   vi) recording the weight of the water soluble glue;
   vii) releasing the non-water soluble glue by washing the mixed-color cullet sample with a suitable solvent such as acetone, thereby loosening any remaining labels and retaining the wash solvent;
   viii) collecting and evaporating the wash solvent to dryness;
   ix) recording the weight of non-water soluble glue;
   x) returning the sample to the air floatation column described in i) and ii) to remove labels that were loosed from the glass in steps iv) and vii); and
   xi) combining the weights of materials captured in steps iii), iv), vii), and x) and dividing by the total weight of the mixed-color cullet sample.

Other standard organics analysis methods: Those skilled in the art will appreciate that the organics analysis of the mixed-color cullet sample may be performed by any known methods.

Step 135—Storing analysis results. In this step, the results of the mixed-color cullet analysis operations of steps 120, 125, and 130 are stored within any conventional computer, such as a personal computer, laptop computer, or networked computer, and used as input parameters to a software routine used for determining the glass batch formulation for use by the glass manufacturing plant. More specifically, the results of the particle size analysis of step 120 in the form of mixed-color cullet particle size in millimeters vs. expected cumulative percent finer than (CPFT), the results of the particle color analysis of step 125 in the form of the calculated weight percent of each color, and the results of the organics analysis of step 130 in the form of a moisture loss and combustible organic loss parameters are stored in a computer.

Step 140—Determining glass batch formulation. In this step, the glass batch formulation is determined by using the stored results of the mixed-color cullet analysis operations of steps 120, 125, and 130 as input parameters to a software routine used for determining the glass batch formulation, preferably by using the method of determining the glass batch formulation as described in U.S. Pat. No. 6,230,521, entitled, "Method of recycling batches of mixed-color cullet into amber, green, or flint glass with selected properties."

Step 145—Providing cullet specification and batch formulation to glass manufacturer. In this step, based upon the analysis operations of steps 120, 125, and 130, the mixed-color cullet profile is provided to the glass manufacturing plant along with the mixed-color cullet-specific glass batch formulation, thereby allowing the glass manufacturer to customize a batch formulation to the received glass batch.

Step 150—Adjusting glass batch formulation. In this step, the glass batch formulation is modified at the glass manufacturing plant according to the mixed-color cullet-specific glass batch formulation established in step 140. For example, the cullet color distribution, organics content and/or particle size information may be used as part of a computer-controlled process which automatically determines the proper amounts of raw materials to add to the batch of mixed colored cullet so that recycled glass is produced having the desired coloring oxides, redox agents, and glass structural oxides in the proper proportion, as described in U.S. Pat. No. 6,230,521.

It is noted that during the execution of the steps of the method, if materials fall out of specification a flag is raised and the material may be conditionally rejected or sent back to the glass processing facility for further processing. Thus, the results from any one of, or all, the analyses may be used as a quality control or threshold metric. Such a metric may be used to determine usability or desirability of a discrete cullet supply.

In summary, the method of the present invention provides a way of determining the constituents and impurities in mixed-color cullet to facilitate its use in glass manufacture. More specifically, certain prefened embodiments of the present invention determines the constituents and impurities in mixed-color cullet, such as, but not limited to, thee-color mixed cullet, as described in reference to U.S. patent application Ser. No. 11/270,654 entitled, "System for and method of mixed-color cullet characterization and certification and providing contaminant-free, uniformly colored mixed color cullet." However, the present invention is suitable for use with any mixed-color cullet, such as two-, four-, or five-color mixed cullet, within which there is no one predominant color of 90% or more. Furthermore, the present invention (1) verifies that the mixed-color cullet being supplied to the glass manufacturer meets predetermined minimum standards, and (2) determines what allowable contaminants and impurities, such as organics, remain in the mixed-color cullet and at what levels, thereby allowing the glass batch formulation to be adjusted accordingly at the glass manufacturer.

Certain preferred embodiments of the present invention further provides a computer controlled process that identifies virgin glass raw materials, uses as inputs results obtained from, either singularly or in combination, results from a particle color analysis, a particle size analysis, or an organics analysis; the desired target glass composition; and the quality and amount of cullet to be used in the glass melt. A controller determines the proper amount of raw materials to add to the batch of mixed cullet so that the recycled glass is produced having the desired coloring oxides, redox agents, glass structural oxides, etc. in the proper proportion. The amount and identity of raw materials, desired coloring oxides, redox agents, glass structural oxides, etc. added to a batch is adjusted based on cullet constituents.

The invention having been disclosed in connection with the foregoing variations and examples, additional variations will now be apparent to persons skilled in the art. The invention is not intended to be limited to the variations and examples specifically mentioned, and accordingly reference should be made to the appended claims to assess the spirit and scope of the invention in which exclusive rights are claimed.

What is claimed is:

1. A method of adjusting a glass batch formulation for making glass using recycled mixed-color glass cullet as a raw material, comprising the steps of:
    collecting at least one sample from a quantity of mixed-color glass cullet;
    performing particle size analysis, on said sample; and
    determining a glass batch adjustment formulation for said glass cullet quantity using a result from said particle size analysis.

2. The method of claim 1, further comprising the step of providing to a glass manufacturer said glass batch adjustment formulation, and a cullet specification for said mixed-color glass cullet.

3. The method of claim 1, wherein a result of said particle size analysis comprises particle size compared to expected cumulative percent finer than (CPFT) data of said mixed-color glass cullet.

4. The method of claim 1, further comprising the step of performing particle color analysis on said sample, wherein a result of said particle color analysis comprises calculated weight percent per color data.

5. The method of claim 1, further comprising the step of performing organics impurities analysis on said sample, wherein a result of said organics impurities analysis comprises moisture loss data.

6. The method of claim 5, wherein a result of said organics impurities analysis comprises combustible organics loss data.

7. The method of claim 1, further comprising the step of utilizing a result from said particle size analysis as a quality control metric.

8. The method of claim 1, further comprising the step of storing a result from said particle size analysis onto computer-readable media.

9. The method of claim 1, wherein collecting said sample comprises the steps of:
    collecting at least one portion of cullet per unit time per said quantity of cullet;
    said at least one portion forming a composite volume of said cullet; and
    collecting at least one portion from said composite volume to form said sample.

10. The method of claim 1, wherein said particle size analysis comprises performing sieve analysis.

11. The method of claim 1, wherein said particle size analysis comprises performing optical imaging analysis.

12. The method of claim 4, wherein said particle color analysis comprises performing X-ray spectroscopy.

13. The method of claim 4, wherein said particle color analysis comprises performing optical transmission analysis.

14. The method of claim 4, wherein said particle color analysis comprises performing optical reflectivity analysis.

15. The method of claim 4, wherein said particle color analysis comprises:
    selecting at least one portion of the sample;
    characterizing the constituents of said portion by at least one of color and size; and
    calculating the weight percent of each color of said portion.

16. The method of claim 5, wherein the method of organic impurities analysis comprises determining the chemical oxygen demand (COD) of said sample.

17. The method of claim 5, wherein the method of organic impurities analysis comprises determining the loss on ignition (LOI) of said sample.

18. The method of claim 1, further comprising the step of producing at least one recycled glass product using said quantity of mixed-color glass cullet in accordance with said glass batch adjustment formulation.

19. The method of claim 18, wherein said recycled glass product is a beer bottle.

20. The method of claim 17, wherein the step of determining the loss on ignition (LOI) comprises the steps of:
    heating a sample in a furnace to between about 100° C. and about 120° C.;
    weighing said sample;
    determining the moisture loss due to drying;
    heating said sample to between about 500° C. and about 550° C.;
    weighing said sample; and
    determining the combustible organic loss from ignition.

21. The method of claim 17, wherein the step of determining LOI comprises heating said sample to at least about 500° C.

22. The method of claim 5, wherein said organics impurities analysis measures to a resolution of at least about 0.10 grams per 2 kg of sample.

23. The method of claim 5, wherein said organic impurities analysis comprises performing an elutriation method.

24. The method of claim 23, wherein the elutriation method comprises the steps of:
    air-floating at least a portion of said sample at a sufficient rate to separate at least one constituent of said sample;
    collecting the separated constituent;
    water-washing said portion at a sufficient temperature to separate at least one second constituent of said sample;
    collecting said separated second constituent;
    solvent-washing said portion to separate at least one third constituent of said sample;
    collecting said solvent washed second constituent;
    air-floating said portion at a sufficient rate to separate at least one fourth constituent of said sample;
    collecting said fourth constituent; and
    calculating the weight percent of all separated constituents.

25. A method of adjusting a glass batch formulation for making glass using recycled mixed-color glass cullet as a raw material, comprising the steps of:
    obtaining a result from a particle size analysis performed on at least one sample of mixed-color glass cullet; and
    determining a glass batch adjustment formulation for said mixed-color glass cullet using a result from said particle size analysis.

26. The method of claim 25, wherein a result of said particle size analysis comprises particle size of said mixed-color glass cullet compared to expected cumulative percent finer than (CPFT) data of said mixed-color glass cullet.

27. The method of claim 25, further comprising the step of performing particle color analysis on said sample, wherein a result of said particle color analysis comprises calculated weight percent per color data.

28. The method of claim 25, further comprising the step of performing organics impurities analysis on said sample, wherein a result of said organics impurities analysis comprises moisture loss data.

29. The method of claim 28, wherein a result of said organics impurities analysis comprises combustible organics loss data.

30. The method of claim 25, further comprising the step of utilizing a result from said particle size analysis as a quality control metric.

31. The method of claim 25, further comprising the step of storing a result from said particle size analysis onto computer-readable media.

32. The method of claim 25, wherein collecting said sample comprises the steps of:
    collecting at least one portion of cullet per unit time per said quantity of cullet, said at least one portion forming a composite volume of said cullet; and
    collecting at least one portion from said composite volume to form said sample.

33. The method of claim 25, wherein said particle size analysis comprises performing sieve analysis.

34. The method of claim 25, wherein said particle size analysis comprises performing optical imaging analysis.

35. The method of claim 27, wherein said particle color analysis comprises performing X-ray spectroscopy.

36. The method of claim 27, wherein said particle color analysis comprises performing optical transmission analysis.

37. The method of claim 27, wherein said particle color analysis comprises performing optical reflectivity analysis.

38. The method of claim 27, wherein said particle color analysis comprises:
    selecting at least one portion of the sample;
    characterizing the constituents of said portion by at least one of color and size; and
    calculating the weight percent of each color of said portion.

39. The method of claim 28, wherein the method of organic impurities analysis comprises determining the chemical oxygen demand (COD) of said sample.

40. The method of claim 28, wherein the method of organic impurities analysis comprises determining the loss on ignition (LOI) of said sample.

41. The method of claim 40, wherein the step of determining the loss on ignition (LOI) comprises the steps of:
    heating a sample in a furnace to between about 100° C. and about 120° C.;
    weighing said sample;
    determining the moisture loss due to drying;
    heating said sample to between about 500° C. and about 550° C.;
    weighing said sample; and
    determining the combustible organic loss from ignition.

42. The method of claim 40, wherein the step of determining LOI comprises heating said sample to at least about 500° C.

43. The method of claim 28, wherein said organics impurities analysis measures to a resolution of at least about 0.10 grams per 2 kg of sample.

44. The method of claim 28, wherein said organic impurities analysis comprises performing an elutriation method.

45. The method of claim 44, wherein the elutriation method comprises the steps of:
    air-floating a portion of said sample at a sufficient rate to separate at least one constituent of said sample;
    collecting the separated constituent;
    water-washing said portion at a sufficient temperature to separate at least one second constituent of said sample;
    collecting said separated second constituent;

solvent-washing said portion to separate at least one third constituent of said sample;
collecting said solvent washed second constituent;
air-floating said portion at a sufficient rate to separate at least one fourth constituent of said sample;
collecting said fourth constituent; and
calculating the weight percent of all separated constituents.

46. The method of claim 25, further comprising the step of producing at least one recycled glass product using said quantity of mixed-color glass cullet in accordance with said glass batch adjustment formulation.

47. The method of claim 46, wherein said recycled glass product is a beer bottle.

* * * * *